United States Patent
Wu et al.

(10) Patent No.: US 10,175,715 B2
(45) Date of Patent: Jan. 8, 2019

(54) REFERENCE CLOCK-LESS CMOS IMAGE SENSOR

(71) Applicant: OMNIVISION TECHNOLOGIES, INC., Santa Clara, CA (US)

(72) Inventors: Charles Qingle Wu, Palo Alto, CA (US); Li Yang, Fremont, CA (US); Zhenhua Zhu, Shanghai (CN)

(73) Assignee: OmniVision Technologies, Inc., Santa Clara, CA (US)

( * ) Notice: Subject to any disclaimer, the term of this patent is extended or adjusted under 35 U.S.C. 154(b) by 134 days.

(21) Appl. No.: 15/272,145

(22) Filed: Sep. 21, 2016

(65) Prior Publication Data

US 2018/0081389 A1 Mar. 22, 2018

(51) Int. Cl.
G06F 3/00 (2006.01)
G06F 13/42 (2006.01)
G06F 1/08 (2006.01)
H04N 5/374 (2011.01)

(52) U.S. Cl.
CPC .............. *G06F 1/08* (2013.01); *G06F 3/005* (2013.01); *G06F 13/4291* (2013.01); *H04N 5/374* (2013.01)

(58) Field of Classification Search
None
See application file for complete search history.

(56) References Cited

U.S. PATENT DOCUMENTS

| 7,068,113 | B2* | 6/2006 | Jasa | H03L 7/089 331/44 |
| 8,013,824 | B2* | 9/2011 | Chu | G09G 3/3696 345/90 |
| 8,270,501 | B2* | 9/2012 | Best | G06F 1/06 375/260 |
| 9,276,585 | B2 | 3/2016 | Nakamura et al. | |
| 9,614,537 | B1* | 4/2017 | Nandwana | H03L 7/24 |
| 2014/0118038 | A1* | 5/2014 | Lin | H03L 7/105 327/149 |
| 2014/0336623 | A1* | 11/2014 | Van Rens | H04L 7/02 604/528 |
| 2014/0361840 | A1* | 12/2014 | Liu | H03L 7/06 331/18 |

OTHER PUBLICATIONS

Taiwanese Office Action and Translation dated Sep. 19, 2018, for Taiwanese Application No. 106132172, filed Sep. 20, 2017, 9 pages.

* cited by examiner

*Primary Examiner* — Elias Mamo
(74) *Attorney, Agent, or Firm* — Christensen O'Connor Johnson Kindness PLLC

(57) ABSTRACT

Apparatuses and methods for a reference clock-less CMOS image sensor are disclosed herein. An example apparatus may include a controller coupled to an image sensor via a serial bus, and the controller may provide an access burst to the image sensor over the serial bus, the access burst including a plurality of data signals and an associated clock signal, where the associated clock signal is a timing signal for the acquisition of bits of the plurality of data signals. The image sensor may calibrate an internal clock signal in response to a comparison of a number of cycles of the internal clock signal occurring during the access burst to a number of cycles of the associated clock signal occurring during the access burst, where the associated clock signal cycles at a first frequency and the internal clock signal cycles at a second frequency different than the first frequency.

19 Claims, 5 Drawing Sheets

ND OKS 10,175,715 B2

REFERENCE CLOCK-LESS CMOS IMAGE SENSOR

TECHNICAL FIELD

This disclosure relates generally to reference clock generation, and in particular but not exclusively, relates to calibration of an image sensor internal reference clock based on a serial bus communication clock.

BACKGROUND INFORMATION

Image sensors have become ubiquitous. They are widely used in digital still cameras, cellular phones, security cameras, as well as, medical, automobile, and other applications. The technology used to manufacture image sensors has continued to advance at a great pace. For example, the demands of higher resolution and lower power consumption have encouraged the further miniaturization and integration of these devices.

The additional miniaturization has resulted in increased system integration, which has led to a need to avoid system level electromagnetic interference (EMI). Due, at least in part, to system integration, discrete crystal clock generation devices have been eliminated, and a system controller may generate the system clock in its place. An example clock generation circuit may be the phase locked loop (PLL) that is conventionally included in various electronics. However, clock signals generated by PLLs may not be as clean as clock signals generated by crystals leading to unwanted noise. The PLL generated clock signals may also cause, or add to, system EMI noise as well.

Many techniques have been employed to mitigate the effects of EMI noise, such as spread spectrum clocking. However, some of these methods may not entirely eliminate the effects of the noise and/or cause added system requirements, such as additional EMI shielding components.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
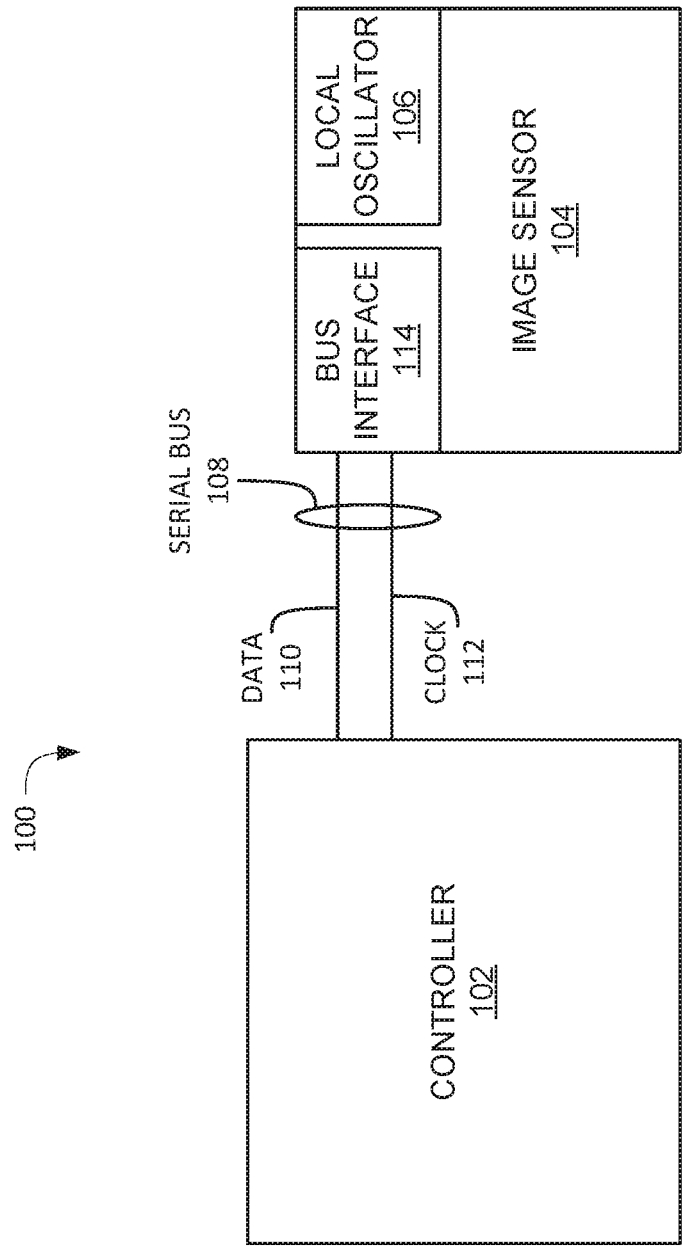
FIG. 1 is a system in accordance with an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an apparatus and method for a reference clock-less CMOS image sensor are described herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As discussed above, system integration may be leading to the replacement of discrete crystal devices conventionally used to generate system reference clock signals with system reference clock signals internally generated by a system controller. An example system controller may be a system on a chip (SoC), which may internally generate the reference system clock signal with an internal PLL circuit, and provided to the various other components of the system, such peripheral devices and the like. The system reference clock signal generated by the controller, however, may have noise characteristics that are worse than those of the crystal generated reference clock signal. For example, the PLL generated system reference clock signal may include jitter, both period jitter and accumulated jitter, which may be worse than the jitter included in the crystal generated clock signals. Further, if the accumulated jitter in the 10-100 KHz range is too large, e.g., greater than 10 ns, then a phase drift between an image sensor internal clock signal and the system reference clock signal may induce horizontal noise problems in images produced by the image sensor.

Moreover, PLL generated system reference clock signals may be a source of EMI. For example, higher order harmonics may be generated by the PLL and included in their outputs, which may interfere with internal clock signals and may cause numerous sub-spurs of various components receiving the system reference clock signal, such as an image sensor. To reduce or eliminate the EMI, a system builder/integrator may be required to include additional system level hardware to shield the system reference clock signal input to receiving devices, such as the image sensor. The additional hardware will likely consume additional space and add cost. As a consequence, the PLL generated system reference clock signal, while potentially saving some system space due to the omitted crystal, may add unwanted noise to the system.

One potential solution to such a problem may be to omit the PLL generated reference clock signal all together, or at least stop the image sensor from receiving the PLL generated reference system clock signal. In its place, an unrelated signal provided by the system controller may be used to calibrate an internal oscillator of the image sensor, which may provide an internal reference clock signal for the image sensor. For example, addressed serial bus signals (data and clock/timing signals), such as inter-integrated circuit (I2C) protocol signals, may be used to calibrate the internal oscillator of the image sensor, which may then provide an internal reference clock signal without constant feedback. As a result, the internal oscillator of the image sensor may operate at a desired frequency, which may be different than the addressed serial bus signal frequency, without experiencing unwanted noise and EMI from the PLL generated reference system clock signal since the PLL generated reference system clock signal will not be received by the image sensor. In short, the image sensor may not receive a reference system clock from a host controller, and serial bus signals, such as I2C signals, may be used to calibrate a frequency of an image sensor internal oscillator.

FIG. 1 is a system 100 in accordance with an embodiment of the present disclosure. Example systems may include portable phones, digital cameras, portable computers, and the like. In general, example computing systems may include a controller, e.g., system on a chip (SoCs), processing cores, etc., in communication with peripheral devices over an addressed serial bus. An example peripheral device may be an image sensor. The controller may control the overall operation of the system 100, for example. In some embodiments, the addressed serial bus may be the I2C protocol that includes separate data and clock signals for communication and addressing between one or more master devices and one or more slave devices. A similar protocol may be the SMBus (System Management Bus). While, at least part of, the discussion of the present disclosure may be based on the I2C protocol, the I2C protocol should not be considered limiting and other addressed serial bus interface protocols are contemplated.

The illustrated embodiment of the system 100 includes a controller 102 coupled to an image sensor 104 via a serial bus 108. The controller 102 and the image sensor 104 may communicate with each other over the serial bus 108. In some embodiments, the controller 102 may be considered the master device and the image sensor 104 may be considered a slave device. While the system 100 is only shown to include the controller 102 and the image sensor 104, the system 100 may additionally include various other peripheral components, such as solid state storage drives, monitors, and sensors, to name just a few, which may all be coupled to and addressed over the serial bus 108.

The controller 102 may be a central processing unit and main controller of the system 100. In general, the controller 102 may control some aspects of the image sensor 104 during operation. For example, the controller 102 may provide control commands to and load firmware onto the image sensor 104 at power up and initialization of the system 100. The controller 102 may, for example, be a SoC, one or more central processing units, one or more microcontrollers, and the like. It should be noted, however, that the type of the controller 102 is a non-limiting aspect of the present disclosure. In general, the controller 102 may provide information to the image sensor 104 over the serial bus 108. The information, which may include commands and firmware for example, may prompt the image sensor 104 to capture images, for example, and may further include operating information regarding the system 100 and/or the operation of the serial bus 108. For example, the controller 102 may inform the image sensor 104 of a frequency the serial bus 108 clock signal may be operating.

The serial bus 108 may include at least two bus lines—a serial data line (DATA) 110 and a serial clock line (CLOCK) 112. The DATA line 110 may be used to provide data, whereas the CLOCK line 112 may provide an associated serial bus clock signal. The serial bus 108 may be an addressed serial bus, such as I2C or SMBus, and may be used to provide commands and information to the image sensor 104 and may further be used to address components coupled to the serial bus 108. Further, in embodiments where the serials bus 108 is an I2C bus, the DATA line 110 may be an I2C serial data line SDA and the CLOCK line 112 may be an I2C serial clock line SCL, as is known in the art. As one skilled in the art would understand, commands provided over the DATA line 110 may be acquired by receiving devices based on cycles of the serial bus clock signal provided over the CLOCK line 112. The serial bus clock signal may be a timing signal indicating to a receiving device when it is being addressed and when data on the DATA line 110 is valid. In general, the serial bus clock signal, or timing signal, provided over CLOCK line 112 may not be the same as a system reference clock signal. For example, a system reference clock signal may be operating at a much higher frequency than the serial bus clock signal. It should be noted that the image sensor 104 may not be receiving a system reference clock signal from the controller 102.

The DATA line 110, as noted, provides data signals to the image sensor 104 while the CLOCK line 112 provides a serial bus clock, or timing signal. As one skilled in the art understands, the combination of the data and clock signals may address the image sensor 104, and further inform the image sensor 104 when data is to be read based on relative high and low logic levels of signals on both the DATA line 110 and CLOCK line 112, which will be discussed in more detail below. In general, data may be provided by the controller 102 in what may be referred to as an access burst, which may be a stringed sequence of bits that form one or more bytes of data. Each access burst may include four or more accumulation cycles. An accumulation cycle may include a byte of data for example. In general, a specific sequence of signals on the DATA line 110 and CLOCK line 112 may indicate a start of an access burst, which may be followed by four accumulate cycles separated by an acknowledge/no acknowledge reply transmission flag. At the end of four accumulation cycles, a stop indicator is received, which is indicated by a specific combination of signals on the DATA line 110 and the CLOCK line 112.

The image sensor 104 may, in response to received image light, photogenerate images, which may occur based on commands sent by the controller 102 for example. The images may be provided to the controller 102 and/or other peripheral devices of the system 100 over the serial bus 108. Example image sensors may include complementary metal-oxide-semiconductor (CMOS) image sensors, charged coupled device (CCDs), and the like. The illustrated embodiment of the image sensor 104 includes a bus interface 114 and a local oscillator (LO) 106.

The bus interface 114 may be coupled to interface with the serial bus 108, and may be one of many communication interfaces of the image sensor 104. The bus interface 114, in some embodiments, may include receivers, transmitters, and physical layer circuits for the acquisition and interpretation of signals received over the serial bus 108, for example. The bus interface 114 may convert data on the DATA line 110 into commands in conjunction with the serial bus clock signal received on the CLOCK line 112. The commands may then be executed by the image sensor 104, for example. While the bus interface 114 is shown to be a separate functional block of the image sensor 104, the depiction is for ease of discussion and the bus interface 114 may in general be included with or combined with other circuits of the image sensor 104.

In some embodiments, the bus interface 114 may be coupled to provide information regarding the serial bus clock signal to the LO 106. Additionally, in some embodiments the bus interface 114 may also provide the serial bus clock signal to the LO 106. In some embodiments, the bus interface 114 may be specific to various addressed serial bus protocols, such as I2C and SMBus. For example, the bus interface 114 may be an I2C bus interface coupled to receive SDA and SCL I2C signals.

The LO 106 may generate an internal reference clock signal for the image sensor 104. The internal reference clock signal may be calibrated by the LO 106 based on the serial bus clock signal provided on CLOCK line 112. In some embodiments, the serial bus clock signal on the CLOCK line 112 may be used to calibrate the internal reference clock of the LO 106 during power up and initialization of the system 100. Periodically, the internal reference clock may be recalibrated, but may generally operate without constant feedback once power up and initialization has concluded. In some embodiments, the LO 106 may at least include a calibration circuit, an oscillator, and a clock divider circuit.

In operation, the controller 102 may provide commands and firmware to the image sensor 104 at power up and initialization of the system 100. In some embodiments, the controller 102 may first inform the image sensor 104 of the clock rate at which the serial bus clock signal on the CLOCK line 112 may be operating, e.g., its operating frequency. The clock rate at which the serial bus clock signal operates may range from 400 KHz to 1 MHz, for example. In some embodiments, the rate of the serial bus clock signal may be 400 KHz. The clock rate may be provided over the DATA line 110 as an eight-byte word, which may be 0000 to indicate 400 KHz and FFFF to indicate 1 MHz, for example. Frequencies in between may be indicated by other hexadecimal values. The clock frequency indicator data may be stored by the image sensor 104, and may be used for the calibration of the LO 106. The clock frequency indicator may be stored in a register associated with the bus interface 114 and/or the LO 106, for example. The clock frequency indicator informs the image sensor of the frequency of the serial bus clock signal on the CLOCK line 112, which may be used to calibrate an operating frequency of an oscillator of the LO 106 that generates the internal reference clock signal of the image sensor 104.

Sometime after the clock frequency indicator is received, the controller 102 may provide a plurality of access bursts to the image sensor 104. The plurality of access bursts may include additional operating commands and firmware for the image sensor 104. In some embodiments, the additional commands and firmware may be provided in about 200 access bursts. With each access burst including four or more accumulation cycles, that is roughly 800 accumulation cycles received by the image sensor 104 during power up and initialization. While the bus interface 114 may receive the access bursts, the LO 106 may be coupled to receive the CLOCK line 112 so that it may monitor the cycles of the serial bus clock signal thereon. By monitoring the serial bus clock signal, or more precisely the cycling of the serial bus clock signal during each access burst, the LO 106 may be able to calibrate an internal oscillator circuit.

During the calibration process, the LO 106 may count a number of cycles of the serial bus clock signal occurring on the CLOCK line 112 during an access burst or each access burst of a plurality of access bursts. Additionally, the LO 106 may also count a number of cycles of the internal reference clock signal occurring during the same access burst. By comparing the number of cycles of the serial bus signal that occurs during an access burst at a known frequency to the counted number of cycles of the internal reference clock signal occurring during the same access burst, the LO 106 may be able to determine an effective frequency of its internal oscillator and provide feedback in response. The feedback, which may be in the form of a calibration code, may adjust the frequency of the internal oscillator of the LO 106 plus or minus in order to achieve a desired operating frequency. In some embodiments, the desired operating frequency may be about 24 MHz or higher. The calibration code may be provided after the access burst, then the process may be repeated for the next access burst. The calibration process may occur within each of the 200 or so access bursts received during power up and initialization, which may result in the internal oscillator of the LO 106 being desirably calibrated to provide an internal reference clock signal at the desired frequency. After power up and initialization, the internal oscillator of the LO 106 may provide the internal reference clock signal to the image sensor 104 without constant feedback.

Figure 2:
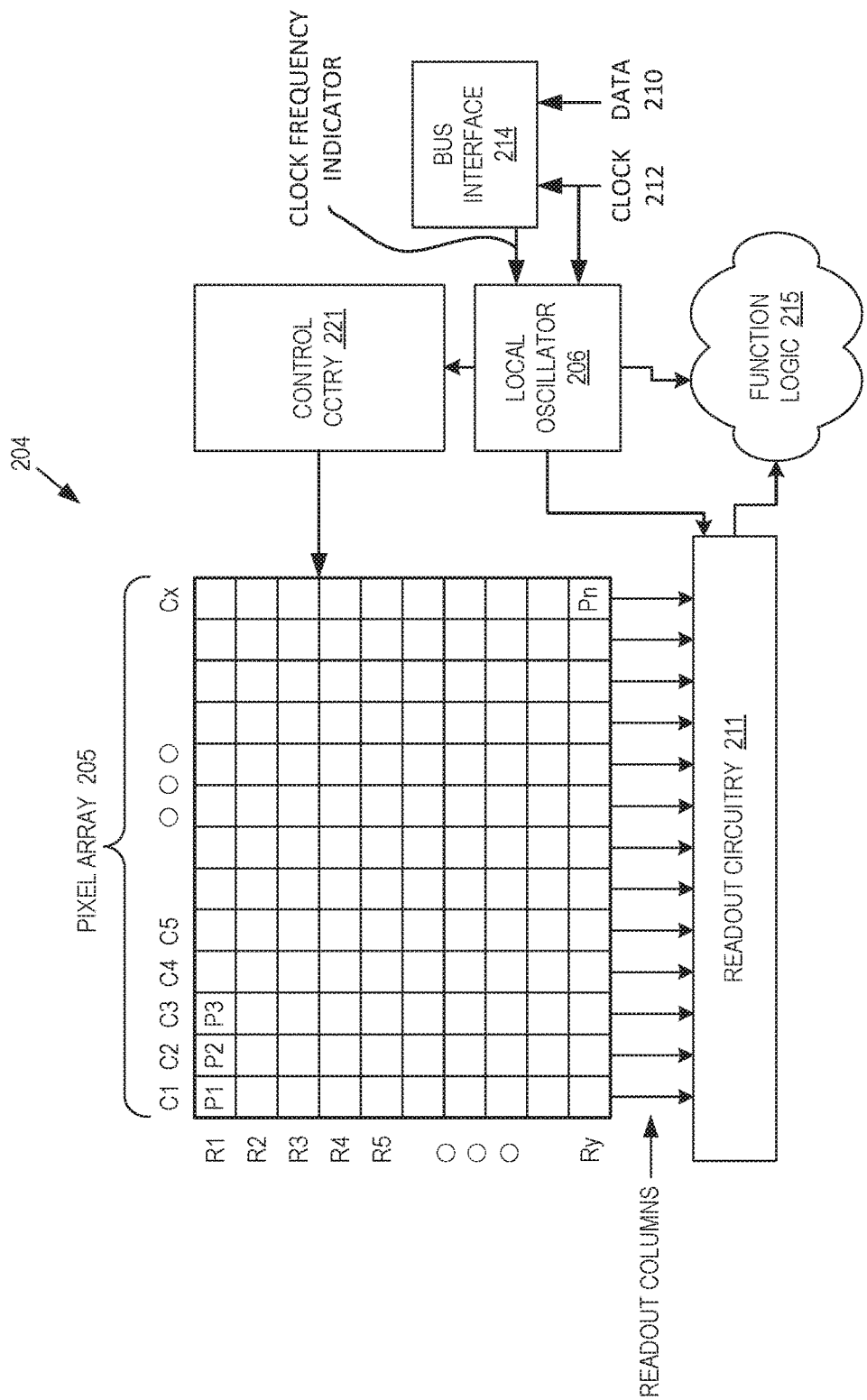
FIG. 2 illustrates one example of an image sensor in accordance with an embodiment of the present invention.

FIG. 2 illustrates one example of an image sensor 204 in accordance with an embodiment of the present disclosure. Image sensor 204 includes pixel array 205, control circuitry 221, readout circuitry 211, function logic 215, bus interface 214, and local oscillator (LO) 206. In one example, pixel array 205 is a two-dimensional (2D) array of photodiodes, or image sensor pixels (e.g., pixels P1, P2 . . . , Pn). As illustrated, photodiodes are arranged into rows (e.g., rows R1 to Ry) and columns (e.g., column C1 to Cx) to acquire image data of a person, place, object, etc., which can then be used to render a 2D image of the person, place, object, etc. However, photodiodes do not have to be arranged into rows and columns and may take other configurations.

In one example, after each image sensor photodiode/pixel in pixel array 205 has acquired its image data or image charge, the image data is readout by readout circuitry 211 and then transferred to function logic 215. Readout circuitry 211 may be coupled to readout image data from the plurality of photodiodes in pixel array 205. In various examples, readout circuitry 211 may include amplification circuitry, analog-to-digital (ADC) conversion circuitry, or otherwise. Function logic 215 may simply store the image data or even manipulate the image data by applying post image effects (e.g., crop, rotate, remove red eye, adjust brightness, adjust contrast, or otherwise). In one example, readout circuitry 211 may readout a row of image data at a time along readout column lines (illustrated) or may readout the image data using a variety of other techniques (not illustrated), such as a serial readout or a full parallel readout of all pixels simultaneously.

In one example, control circuitry 221 is coupled to pixel array 205 to control operation of the plurality of photodiodes in pixel array 205. For example, control circuitry 221 may generate a shutter signal for controlling image acquisition. In one example, the shutter signal is a global shutter signal for simultaneously enabling all pixels within pixel array 205 to simultaneously capture their respective image data during a single acquisition window. In another example, the shutter signal is a rolling shutter signal such that each row, column, or group of pixels is sequentially enabled during consecutive acquisition windows. In another example, image acquisition is synchronized with lighting effects such as a flash.

In one example, the bus interface 214 may be coupled to receive serial bus signals, such as serial data and clock signals, via the serial data line (DATA) 210 and the serial clock line (CLOCK) 212. Together, the DATA line 210 and the CLOCK line 212 may form an addressed serial bus, such as the serial bus line 108. In some embodiments, the serial bus lines may be I2C bus lines. Signals received on the DATA line 210 and the CLOCK line 212 may be provided by a controller, such as the controller 102. The signals received over the bus lines may provide commands and firmware to the image sensor 204, for example. The DATA 210 and CLOCK 212 bus lines may be serial bus lines that provide serial data signals and an associated reference clock signal, respectively. The reference clock signal provided on the CLOCK line 212 may conventionally be used to provide timing signals for the proper acquisition of the data signals provided on the DATA line 210. At least some of the signals, such as the serial bus clock signal on the CLOCK line 212, may be used by the image sensor 204 to calibrate a clock frequency of an internal reference clock signal.

The LO 206 may generate the internal reference clock signal and provide the same to various other functional blocks of the image sensor 204, such as the control circuitry 221, the function logic 215, and the readout circuitry 211, along with other areas of the image sensor 204 not shown. The control circuitry 221 and the readout circuitry 211 may base the performance of global shutter commands and readout commands, respectively, on the received clock signal, for example. In some embodiments, the LO 206 may calibrate the internal reference clock signal based on the clock signal on the CLOCK line 212.

The LO 206 may include various circuits that work in concert to calibrate the internal reference clock, which may be generated by an internal oscillator, for example, such as a PLL circuit. The LO 206 may be provided a serial bus clock frequency indicator by the bus interface 214. Additionally, the LO 206 may be coupled to receive the serial bus clock signal from the CLOCK line 212. The LO 206, based on the known frequency of the serial bus clock signal, may monitor the serial bus clock signal and compare a number of cycles of the serial bus clock signal to a number of cycles of the internal reference clock signal to determine a current effective clock rate of the internal reference clock signal. In response, the internal reference clock signal may be adjusted to become closer to a desired clock rate. An example desired clock rate may be 24 MHz. The internal reference clock signal may be adjusted after each access burst of a plurality of access bursts. In some embodiments, there may be 200 access bursts received by the image sensor 204 during power up and initialization. An access burst, as noted above, may be a burst of data, which may include commands and firmware broken into four accumulation cycles of 8 bits per accumulation cycle.

Once the LO 206 has become calibrated, the LO 206 may begin to provide the other blocks of the image sensor 204 with the internal reference clock signal. Additionally, the LO 206 may provide the internal reference clock signal without receiving constant feedback.

In some embodiments, the LO 206 and the bus interface 214 may be included in the control circuitry 221. The depiction of the LO 206 and the bus interface 214 as being separate from the control circuitry 221 is for ease of discussion and should not be taken as limiting in any aspect.

In one example, image sensor 204 may be included in a digital camera, cell phone, laptop computer, or the like, which may be examples of the system 100. Additionally, image sensor 204 may be coupled to other pieces of hardware such as a processor (general purpose or otherwise), memory elements, output (USB port, wireless transmitter, HDMI port, etc.), lighting/flash, electrical input (keyboard, touch display, track pad, mouse, microphone, etc.), and/or display. Other pieces of hardware may deliver instructions to image sensor 204, extract image data from image sensor 204, or manipulate image data supplied by image sensor 204.

Figure 3:
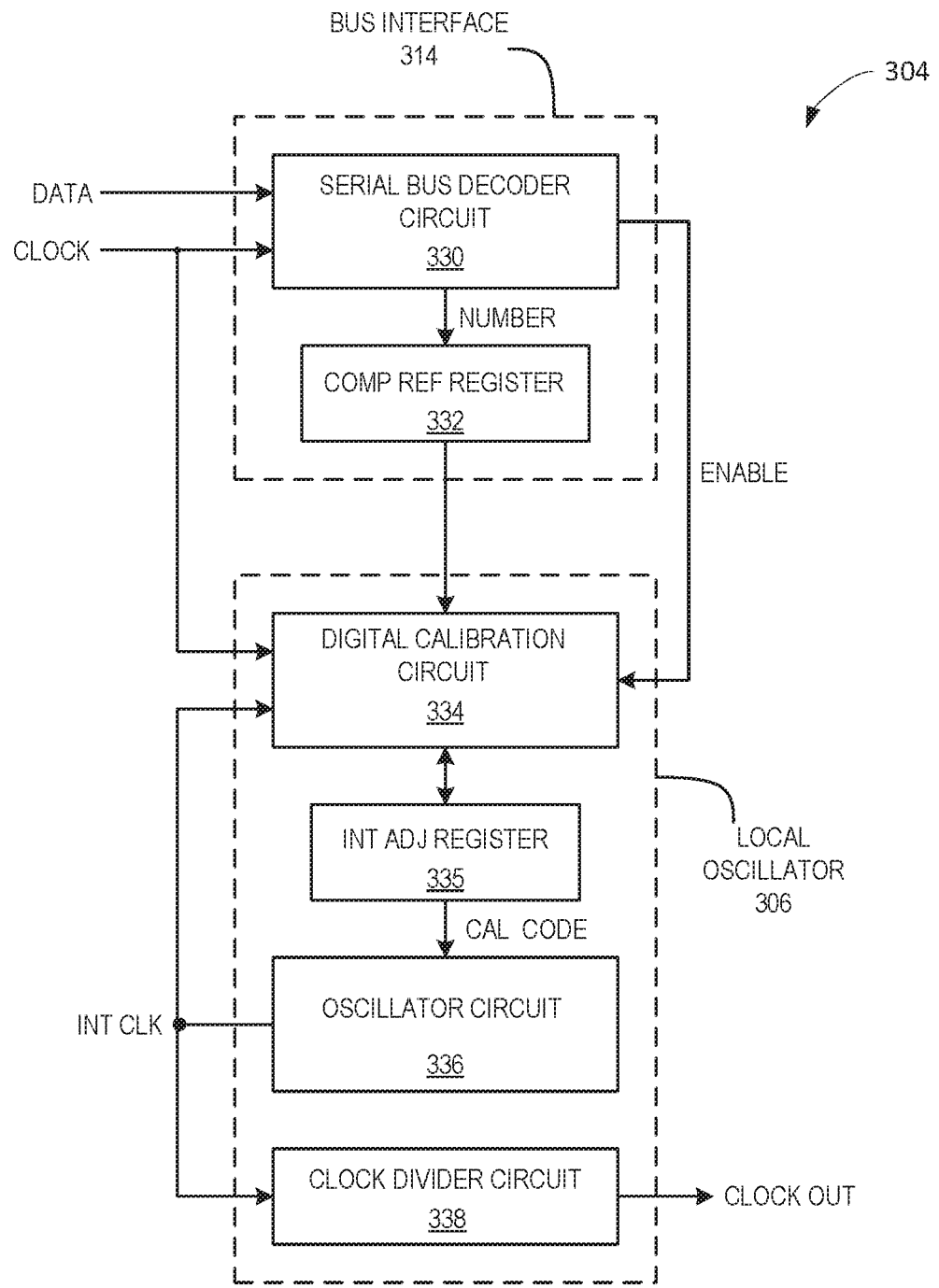
FIG. 3 is a block diagram of at least a portion of an image sensor in accordance with an embodiment of the present invention.

FIG. 3 is a block diagram of at least a portion of an image sensor 304 in accordance with an embodiment of the present disclosure. The image sensor 304 may be an example of the image sensors 104 and 204. The illustrated embodiment of the image sensor 304 includes a local oscillator (LO) 306, and at least a portion of a bus interface 314. Serial bus signals received by the bus interface 314 over serial bus lines DATA and CLOCK may at least be used to calibrate an oscillator of the LO 306. The operation of the image sensor 304 may be described in conjunction with FIGS. 4 and/or 5.

The illustrated embodiment of the bus interface 314 is shown to include a serial bus decoder 330, and a comparison reference register 332. Serial bus decoder 330 may include circuits and functional areas to acquire signals received on the DATA and CLOCK bus lines. For example, commands may be provided on the DATA bus line and an associated serial bus clock signal may be provided on the CLOCK bus line. Further, serial bus decoder circuit 330 may transmit signals over the DATA and CLOCK lines. For example, signals may be received from a controller, such as the controller 102, and provided to the controller. The bus interface 314 may be coupled to provide a serial bus clock frequency indicator to the LO 306. For example, the serial bus decoder circuit 330 may be coupled to provide the I2C frequency indicator to the comparison reference register 332, which may store the I2C frequency indicator and provide the same to the LO 306. While the bus interface 314, including the serial bus decoder 330 and comparison reference register 332, is discussed as a separate component of the image sensor 304, the circuits that form the bus interface 314 and the serial bus decoder 330 may be part of and included in one or more other functional blocks of the image sensor 204, such control circuity 221.

In some embodiments, the bus interface 314 may be an I2C bus interface. In such an embodiment, the DATA and CLOCK bus lines may be I2C SDA and SCL bus lines coupled to transmit serial data and serial clock signals, respectively. In general, the DATA and CLOCK bus lines may form a pair of addressed serial bus lines coupled to both address components coupled thereto to provide commands/information/data. The comparison reference register 332, which may be an eight-byte register, may be coupled to receive the clock frequency indicator from the serial bus decoder 330. The comparison reference register 332 may store the clock frequency indicator and provide the same to the digital calibration circuit 334, for example.

The illustrated embodiment of the LO 306 includes a digital calibration circuit 334, an internal adjustment register 335, an oscillator circuit 336, and a clock divider circuit 338. The digital calibration circuit 334 may be coupled to receive the clock frequency indicator from the comparison reference register 332, an ENABLE signal from the serial bus decoder 330, and further coupled to receive the serial bus clock signal on the CLOCK line. The digital calibration circuit 334 may additionally be coupled to receive an internal reference clock signal INT CLK from the oscillator circuit 336. Detailed operation of the calibration circuit will be discussed in detail below. In general, the digital calibration circuit 334 may determine the time frame of counting within each access burst, as specified by the I2C specification, for example. During this counting period the digital calibration circuit 334 may determine a number of cycles of the internal reference clock signal occurring during each of the same accumulation cycles. Because the digital calibration circuit 334 knows the frequency of the serial bus clock signal, the digital calibration circuit 334 may determine an effective frequency of the internal reference clock signal INT CLK based on the number of cycles occurring during the accumulation cycles.

Based on the determined effective frequency of the internal reference clock signal INT CLK, the digital calibration circuit 334 may determine a difference between a desired clock frequency and the effective clock frequency. The digital calibration circuit 334 may then provide a calibration code to the oscillator circuit 336 via the internal adjustment register 335. The internal adjustment register 335 may additionally store the calibration code. The calibration code may cause the oscillator circuit 336 to adjust the frequency of the internal reference clock signal to reduce or eliminate the difference so that the desired frequency is obtained within allowable thresholds.

The oscillator circuit 336 may be coupled to provide the internal clock reference signal INT CLK, and further coupled to receive the calibration code from the internal adjustment register 335. The oscillator circuit 336 may be a programmable oscillator circuit as known in the art, such as a voltage controlled oscillator, a digital controlled oscillator, and the like. In some embodiments, the oscillator circuit 336 may use a CMOS relaxation technique with temperature compensation, and may further include digital frequency trimming to cover two to three times the frequency range. In some embodiments, the oscillator circuit 336 may desirably generate INT CLK at 24 MHz. In some embodiments, the oscillator circuit 336 may generate INT CLK at frequencies higher than 24 MHz.

The clock divider circuit 338 may be coupled to receive the internal reference clock signal, and may be able to adjust the frequency of the internal reference clock signal. For example, the clock divider circuit 338 may be able to half or quarter the frequency of the internal reference clock signal. The clock divider circuit 338 may be programmable in some embodiments. While the clock divider circuit 338 is shown with the LO 306, the clock divider circuit 338 may be an optional component of the LO 306 in some embodiments.

Figure 4:
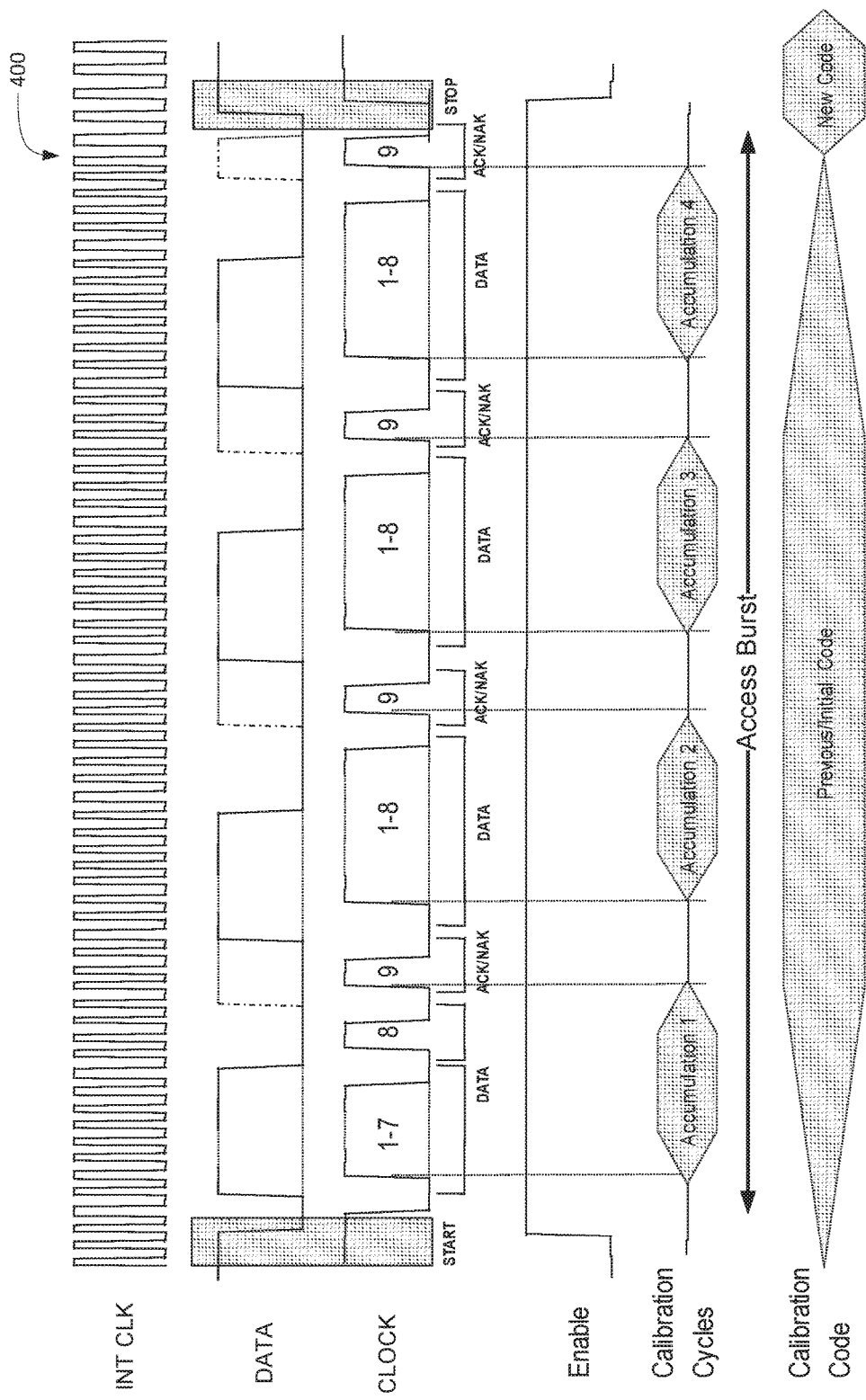
FIG. 4 is an example timing diagram in accordance with an embodiment of the present invention.

FIG. 4 is an example timing diagram 400 in accordance with an embodiment of the present disclosure. The timing diagram 400 shows the changes to the various signals received by and internally generated by the image sensor 304, for example. The timing diagram may in general show the signals during a single access burst received by the image sensor 304, and the generation of a new calibration code at its conclusion.

The illustrated embodiment of the timing diagram 400 includes the internal reference clock signal INT CLK, command/data signals on the DATA line, serial bus clock timing signals on the CLOCK line, the ENABLE signal, four accumulation cycles of an access burst, and the calibration code. Each of the four accumulation cycles may also be referred to as calibration cycles. The access burst is formed from the four accumulation cycles and the interceding acknowledge/no acknowledge ACK/NACK signals. Each accumulation cycle may include up to eight bits or more data so that each access burst includes four bytes or more data, according to the I2C specification, for example.

The image sensor 304 may be included in a host system, such as the system 100, and may receive the access burst shown in the timing diagram 400 at power up and initialization. The signals on DATA and CLOCK may be provided by a host controller, such as the controller 102. Initially, the signals on bus lines DATA and CLOCK may both be at a high logic level. However, to indicate a start of an access burst, the signal on DATA may transition to a low logic level while the signal on CLOCK remains at the high logic level. The indication of the start of the access burst may be identified by the serial bus decoder 330, which may provide the ENABLE signal to the digital calibration circuit 334 in response. Once the digital calibration circuit 334 is enabled, or concurrently, the calibration circuit 334 begins and continues calibrating the frequency of the oscillator circuit 336 until a target resolution is obtained. Further, at power up and initialization an initial or default calibration code may be loaded into the oscillator circuit 336, which may provide the INT CLK signal in response thereto. The default calibration code may be stored in the internal adjustment register 335, for example.

During accumulation 1, the digital calibration circuit 334 may count the number of cycles of the serial bus clock signal occurring during the acquisition of bits 1 through 8. Bit 9, the ACK/NAK signal may not be included in the calibration process. Additionally, during accumulation 1, the calibration circuit 334 may also count the number of cycles of the INT CLK signal, aligned with the transition edges of the serial bus clock. The digital calibration circuit 334 may store the number of cycles of INT CLK signal at the end of accumulation 1. The calibration circuit 334 may count the cycles of the INT CLK in the same manner during each of the subsequent accumulations 2, 3, and 4. After accumulation 4, the serial bus decoder 330 may detect an end to the access burst when the signal on CLOCK line transitions to the high logic level shortly after the signal on the DATA line transitions to the high logic level. In response, the digital core circuit 330 may de-assert the ENABLE signal.

After the four accumulation cycles have completed, the calibration circuit 334 may calculate effective frequency/period of the INT CLK signal based on a certain algorithm to reduce jitter. One non-limiting technique may be based on averaging. More specifically, because the digital calibration circuit 334 knows the frequency of the serial bus clock signal (Fs) from the clock frequency indicator, and it also knows the number of cycles (Ns) of the serial bus clock that has been counted within each access burst according to the I2C specification, the digital calibration circuit 334 may be able to determine an effective frequency of the INT CLK signal based on Fs*(Ni/Ns), where Ni is the total number of cycles of INT CLK counted during access burst.

The digital calibration circuit 334 may determine a difference between the effective frequency of the INT CLK signal and a desired frequency of the INT CLK signal. In some embodiments, the desired frequency of the INT CLK signal may be 24 MHz. In turn, the digital calibration circuit 334 may generate a new calibration code and provide the same to the oscillator circuit 336 via the internal adjustment register 335. The calibration code may cause the oscillator circuit 336 to adjust the frequency of the generation of the INT CLK signal, plus or minus, in order to reduce or eliminate the difference between the desired and effective frequencies. As a result, the oscillator circuit 336 may then provide the INT CLK signal at the adjusted frequency.

Subsequently, the serial bus decoder 330 may detect the start of another access burst, and the calibration process may be performed again resulting in another new calibration code. While the first new calibration code may not completely zero out the difference between the effective and desired frequencies, the difference may become smaller and smaller after a plurality of access bursts. Eventually, the difference may be negligible or within a specified tolerance so that new calibration codes may not be generated. At that point, the INT CLK signal may be provided via the clock divider circuit 338.

Figure 5:
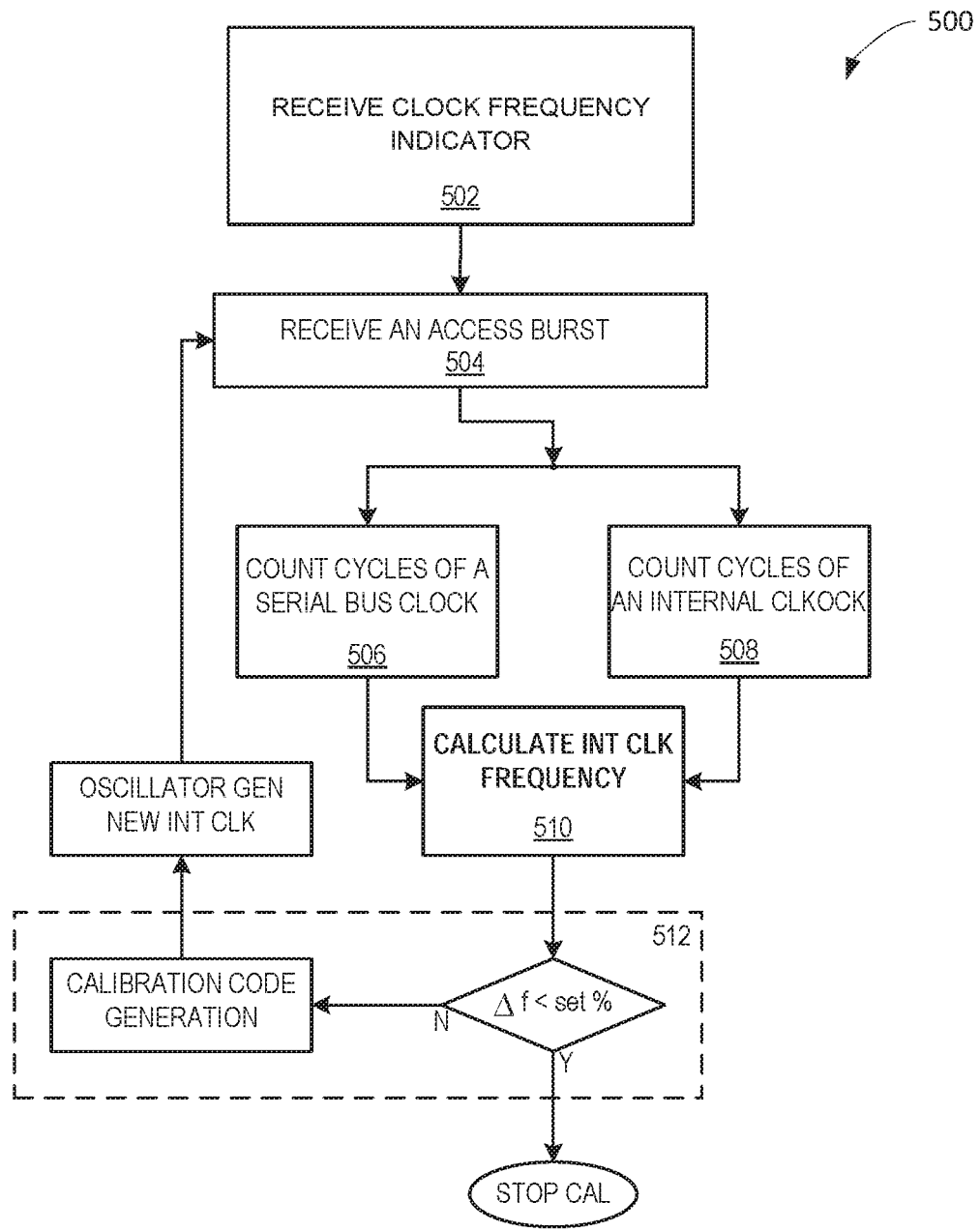
FIG. 5 is a process for calibrating a local oscillator of an image sensor based on a serial bus clock signal in accordance with an embodiment of the present invention.

FIG. 5 is a process 500 for calibrating a local oscillator of an image sensor based on a serial bus clock signal in accordance with an embodiment of the present disclosure. The process 500 may be implemented, for example, by the system 100, the image sensor 204, and/or the image sensor 304. The process 500 may at least occur during power up and initialization of a host system to calibrate an internal reference clock of an image sensor to a desired frequency. After calibration, the internal reference clock, such as the oscillator circuit 336 of the image sensor 304, may continue to provide an internal reference clock signal without receiving constant feedback. Periodically, however, the process 500 may be performed to maintain the desired frequency of the internal reference clock signal. In general, the calibration of the internal reference clock may be based on a non-system reference clock signal, and may instead be based on an unrelated serial bus clock signal conventionally used to acquire data signals on the serial bus. Additionally, the serial bus clock signal may be operating at a much lower frequency than a system reference clock signal, and a desired frequency of the internal reference clock signal.

The process 500 may begin at process block 502, which includes receive a clock frequency indicator over a serial bus. For example, the controller 102 may provide the clock frequency indicator signal to the image sensor 104 over the serial bus 108, which may be an I2C bus. In some embodiments, the clock frequency indicator may be an eight-byte word indicating 400 KHz.

Process block 502 may be followed by process block 504, which may include receive an access burst over the serial bus. For example, the controller 102 may provide the access burst of FIG. 4 to the image sensor 104. The access burst may include four or more accumulation cycles, which may each include 8 bits of data. As discussed, cycles of the serial bus clock signal, such as the CLOCK signal discussed above, may be used to calibrate a clock rate of the internal reference clock of the image sensor.

Process block 504 may be followed by process block 506 and block 508, which include count a number of cycles of the serial bus clock signal on a CLOCK bus line, and count a number of cycles of the internal clock signal INT CLK. Both process blocks 506 and 508 occur during accumulation cycles of the received access burst. For example, a calibration circuit, such as the calibration circuit 334, may count the number of cycles of the serial bus clock signal and the number of clock cycles of the internal clock signal INT CLK occurring during the accumulation cycles of an access burst. In some embodiments, the calibration circuit may average the number of cycles of the INT CLK signal that occur during each of the accumulation cycles at the conclusion of the access burst.

Process block 506 and 508 may be followed by process block 510, which calculates the effective frequency of the internal clock signal INT CLK. Because the frequency of the serial bus clock signal (Fs) is known and stored in comparison reference register 332, and the number of cycles (Ns) of the serial bus clock that has been counted is also known from block 506, based on cycle numbers of the internal clock from block 508 (Ni), the effective frequency of the INT CLK signal may be calculated. One way is to do simple averaging using Fs*(Ni/Ns). Other digital algorithms may alternatively be applied to do digital filtering in order to reduce jitter impact.

Process block 510 may be followed by process block 512, which includes generate of a calibration code based on a difference between the effective frequency of the internal reference clock and a desired frequency. The calibration code may be configured to zero out that difference by adjusting the oscillator circuit accordingly. Certain algorithms may be applied for fast convergence, and to avoid extensive overshoot and/or undershoot. For example, the digital calibration circuit 334 may determine an amount of change the oscillator circuit may need to offset the difference, which may translate into a calibration code. The calibration code may inform the oscillator circuit whether to increase or decrease the oscillation rate to reduce or eliminate the difference. If this difference $\Delta f$ is below a preset threshold, which may be based on an allowable percentage the frequency may deviate from a desired frequency, the calibration code may stop updating and a calibration finish signal cause the digital calibration circuit 334 to cease calibration. As such, the calibration process 500 may stop.

If the frequency difference is greater than the preset threshold, however, a new calibration code may be generated as discussed and the new calibration code may be provided to the oscillation circuit 336, which may adjust its rate of generation of the internal reference clock. The process, at least process blocks 504-512, may repeat for a plurality of access bursts until convergence. In some embodiments, this may be accomplished within 200 access bursts.

The order in which some or all of the process blocks appear in the process 500 should not be deemed limiting. Rather, one of ordinary skill in the art having the benefit of the present disclosure will understand that some of the process blocks may be executed in a variety of orders not illustrated, or even in parallel.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. An image system, comprising:
 a serial bus including first and second bus lines;
 a controller coupled to provide an access burst over the serial bus, the access burst including a plurality of data signals and an associated clock signal, wherein the plurality of data signals is provided on the first bus line and the associated clock signal is provided on the second bus line, and wherein the associated clock signal is a timing signal for the acquisition of bits of the plurality of data signals; and an image sensor coupled to receive the plurality of data signals and associated clock signal over the serial bus, the image sensor further coupled to calibrate an internal clock signal in response to a comparison of a number of cycles of the internal clock signal occurring during the access burst to a number of cycles of the associated clock signal occurring during the access burst, wherein the associated clock signal cycles at a first frequency and the internal clock signal cycles at a second frequency different than the first frequency.

2. The image system of claim 1, wherein the controller is further coupled to provide a clock frequency indicator indicating a clock rate of the associated clock signal, and wherein the image sensor determines an effective frequency of the internal clock signal in response to the clock frequency indicator and the comparison of the number of cycles of the internal clock signal occurring during the access burst to the number of cycles of the associated clock signal occurring during the access burst.

3. The image system of claim 1, wherein the image sensor further includes a serial bus interface coupled to the serial bus.

4. The image system of claim 1, wherein the image sensor further includes a local oscillator coupled to receive the associated clock signal and further coupled to receive a clock frequency indicator from a serial bus interface of the image sensor, the clock frequency indicator indicating a clock rate of the associated clock signal.

5. The image system of claim 4, wherein the local oscillator includes:
a register coupled to receive the clock frequency indicator;
an oscillator circuit coupled to provide the internal clock signal; and
a calibration circuit coupled to receive:
the clock frequency indicator from the register,
an enable signal from the serial bus interface,
the internal clock signal from the oscillator circuit, and
the associated clock signal,
wherein the calibration circuit is coupled to provide feedback to the oscillator circuit to adjust a clock rate of the internal clock signal in response to the comparison of the number of cycles of the internal clock signal occurring during the access burst to the number of cycles of the associated clock signal occurring during the access burst.

6. The image system of claim 5, wherein the local oscillator further includes a clock divider circuit coupled to receive the internal clock signal.

7. The image system of claim 1, wherein the serial bus is inter-integrated circuit serial bus.

8. A method to calibrate an internal reference clock signal based on an unrelated clock signal, the method comprising:
Receiving, with an image sensor, an access burst over an inter-integrated circuit bus coupled to the image sensor, wherein the access burst includes a plurality of accumulation cycles and an associated clock signal, the associated clock signal providing timing information for the acquisition of data included in each of the plurality of accumulation cycles;
comparing a number of cycles of the associated clock signal that occurred during the plurality of accumulation cycles to a number of cycles of the internal reference clock signal that occurred during the plurality of accumulation cycles;

determining an effective frequency of the internal reference clock signal based on the comparison; and
generating, with a calibration circuit, a calibration code based on a difference between the effective frequency and a target frequency of the internal reference clock signal.

9. The method of claim 8, wherein determining an effective frequency of the internal reference clock signal based on the comparison is further based on a clock frequency indicator indicating a clock frequency of the associated clock signal.

10. The method of claim 8, further comprising receiving a clock frequency indicator indicating a clock frequency of the associated clock signal.

11. The method of claim 8, further comprising:
counting the number of cycles of the associated clock signal that occurred during each of the plurality of accumulation cycles; and
counting the number of cycles of an internal reference clock signal that occurred during each of the plurality of accumulation cycles.

12. The method of claim 8, further comprising providing the calibration code to an oscillator circuit generating the internal reference clock signal.

13. The method of claim 8, wherein receiving an access burst comprises receiving a plurality of access bursts, and wherein a new calibration code is generated after each of the plurality of access bursts.

14. An image sensor, comprising:
a plurality of photodiodes arranged into rows and columns to acquire image charge;
a serial bus interface coupled to a serial bus;
an oscillator circuit coupled to provide an internal reference clock signal; and
a calibration circuit coupled to the serial bus interface, the calibration circuit coupled to receive:
a serial bus clock signal from the serial bus,
an internal clock signal from the oscillator circuit, and
a clock frequency indicator from the serial bus interface,
wherein the calibration circuit is coupled to determine an effective frequency of the internal clock signal in response to a comparison of a number of cycles of the serial bus clock signal to a number of cycles of the internal clock signal that occur during receipt of an access burst, and
wherein the calibration circuit is coupled to provide a calibration code to the oscillator circuit in response to a difference between the effective frequency of the internal clock signal and a target frequency of the internal clock signal.

15. The image sensor of claim 14, wherein the calibration circuit is further coupled to count a number of cycles of the serial bus clock signal occurring during the access burst, and further coupled to count a number of cycles of the internal reference clock signal occurring during the same access burst.

16. The image sensor of claim 14, wherein the oscillator circuit is a digital controlled oscillator and is coupled to adjust a frequency of the internal reference clock based on the calibration code.

17. The image sensor of claim 14, further comprising a register coupled to receive the clock frequency indicator from the serial bus interface, the clock frequency indicator indicating a frequency of the serial bus clock signal, and wherein the calibration unit is further coupled to determine the effective frequency of the internal clock signal in response to the clock frequency indicator.

18. The image sensor of claim 14, further comprising a clock divider circuit coupled to receive the internal reference clock signal from the oscillator circuit.

19. The image sensor of claim 14, wherein the serial bus is an inter-integrated circuit serial bus.

\* \* \* \* \*